US007931321B2

(12) United States Patent
Kapoor

(10) Patent No.: US 7,931,321 B2
(45) Date of Patent: Apr. 26, 2011

(54) BUS STRETCHER CONVERSION KIT

(75) Inventor: Amit Kapoor, Falls Church, VA (US)

(73) Assignee: First Line Technology, LLC, Chantilly, VA (US)

( * ) Notice: Subject to any disclaimer, the term of this patent is extended or adjusted under 35 U.S.C. 154(b) by 0 days.

(21) Appl. No.: 12/696,584

(22) Filed: Jan. 29, 2010

(65) Prior Publication Data

US 2010/0187848 A1 Jul. 29, 2010

Related U.S. Application Data

(60) Provisional application No. 61/148,108, filed on Jan. 29, 2009.

(51) Int. Cl.
*B23P 11/00* (2006.01)
*A61G 3/00* (2006.01)
*A61G 1/06* (2006.01)

(52) U.S. Cl. ............................ 296/19; 248/351; 29/428

(58) Field of Classification Search .................... 296/19, 296/20; 5/625, 628; 29/428; 248/351, 352, 248/354.1

See application file for complete search history.

(56) References Cited

U.S. PATENT DOCUMENTS

| | | | | |
|---|---|---|---|---|
| 2,385,067 | A * | 9/1945 | Egardner | 5/627 |
| 4,006,500 | A * | 2/1977 | Bonifay | 5/625 |
| 4,210,355 | A * | 7/1980 | Legueu | 296/19 |
| 5,489,137 | A | 2/1996 | Herrmeyer | |
| 5,509,159 | A * | 4/1996 | Du-Bois | 5/627 |
| 6,440,160 | B1 * | 8/2002 | Cordani et al. | 5/625 |
| 6,978,499 | B2 * | 12/2005 | Gallant et al. | 5/600 |
| 7,243,386 | B2 * | 7/2007 | Gallant et al. | 5/600 |
| 7,461,857 | B2 * | 12/2008 | Darling, III | 5/626 |
| 2006/0033359 | A1 | 2/2006 | Taylor | |
| 2008/0295249 | A1 * | 12/2008 | Noltimier et al. | 5/620 |

FOREIGN PATENT DOCUMENTS

| | | |
|---|---|---|
| EP | 0716843 | 6/1996 |
| JP | 01082024 | 6/1989 |
| WO | 8403040 | 8/1984 |
| WO | 2006066735 | 6/2006 |

OTHER PUBLICATIONS

International Search Authority, International Search Report, International Application No. PCT/US2010/022570, Aug. 26, 2010, 5 Pages.

* cited by examiner

*Primary Examiner* — Lori L Lyjak
(74) *Attorney, Agent, or Firm* — MH2 Technology Law Group LLP

(57) ABSTRACT

A framework for supporting stretchers and method of assembling includes a sub-frame having an adjustable length header bar assembly and adjustable height outer frame legs connected to opposing ends of the header bar assembly. A secondary stretcher support is positioned laterally interior of and parallel with each outer frame leg, each of the secondary stretcher support and outer frame leg including stretcher holders. Interframe connectors are transversely positioned between pairs of sub-frames and pairs of secondary stretcher supports. Stretcher handles seat in the stretcher holder and the secondary stretcher support. The framework is configured to fit within varying dimensions of a mass transit vehicle and can be a component of a vehicle conversion kit. The kit can further include tools for assembling the framework, assembly instructions, and a crate for storing and transporting at least the framework, supports, tools, and assembly instructions.

34 Claims, 14 Drawing Sheets

| KC# | Part Name |
|---|---|
| 1 | Kit Crate, Wooden, Palletized |
| 2 | Packing List, Kit Card |
| 3 | Horizontal Inter-Frame Connector |
| 4 | Frame, Angled Header Bar |
| 4A | Header Support Bar |
| 5 | Outer Frame Leg |
| 5A | Outer Frame Leg, Inner Bar |
| 6 | Support Leg |
| 6A | Support Leg, Adjustable Height Screw |
| 7 | Stretcher Holder |
| 8/8A | Nylon Stretcher Suspend Strapping with Ultra-Light Straight Carabineer |
| 9 | Weight Bearing Arm for Stretcher |

| KC# | Part Name |
|---|---|
| 10 | Frame Fitted Insert |
| 11 | Inter-Frame Connector Mount |
| 12 | Frame Support Leg Mount |
| 13 | Anchor Plate |
| 14 | Rubber Wedge |
| 15 | Frame, Ceiling Pressure Mount |
| 16 | Frame, Wall Support Mount |
| 17 | Frame Plastic End Cap, Large |
| 18 | Bracket Connector to Frame, Wall Support Mount |
| 19 | Bracket Connector to Frame, Ceiling Pressure Mount |
| 20 | Box of Accessories, Installation Tools |
| 21 | Header Bar Cover |
| 22 | Rubber Bolt Covers |

FIG. 9

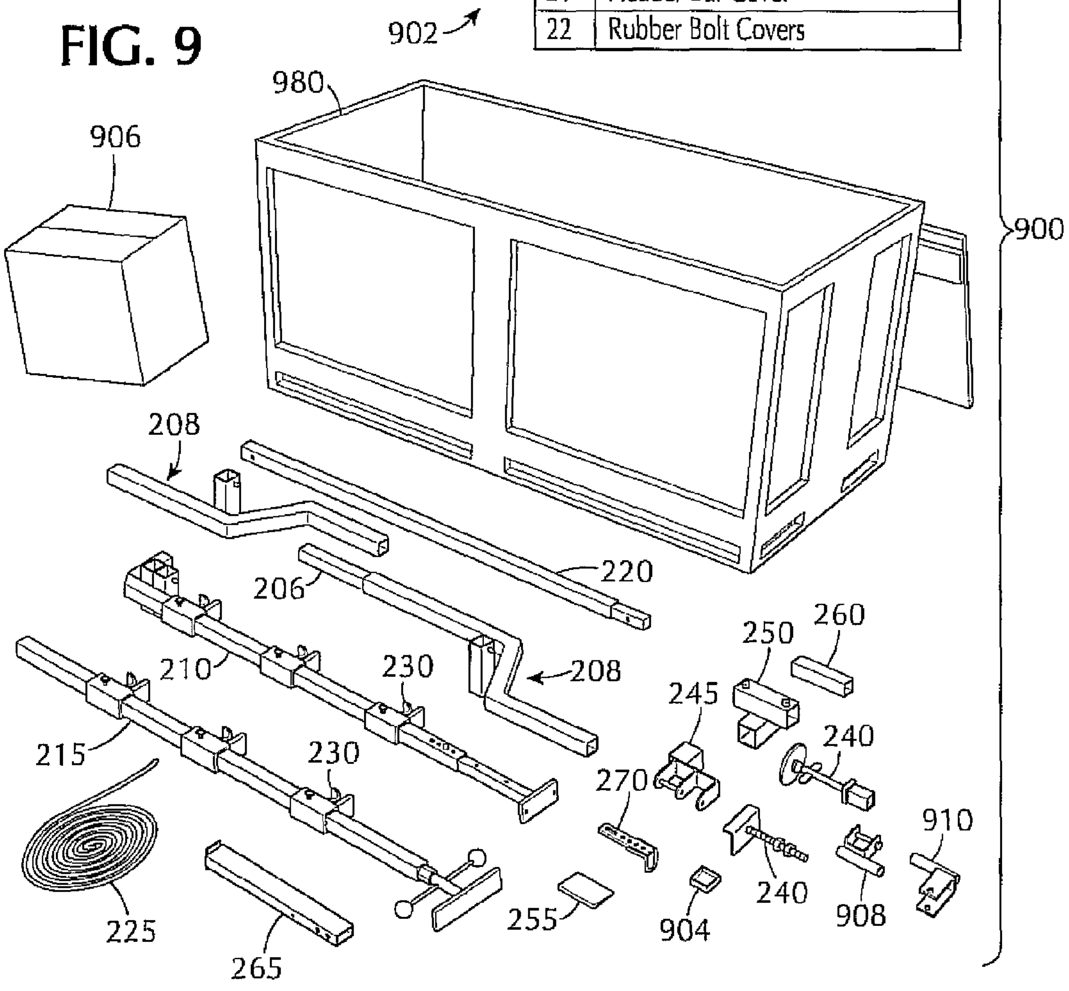

BUS STRETCHER CONVERSION KIT

CROSS-REFERENCE TO RELATED APPLICATIONS

This application claims priority from Provisional Patent Application Ser. No. 61/148,108, filed Jan. 29, 2009, which is herein incorporated by reference in its entirety.

FIELD

The present disclosure generally relates to mass casualty transport. More particularly, exemplary embodiments relate to a stretcher support structure, and the structure incorporated into a kit for converting a large vehicle into transportation for multiple stretchers and emergency equipment. Assembly of part or all of one or more kits can be used to configure temporary or permanent structures for use in virtually any location, whether mobile or stationary.

BACKGROUND

In the event of an accident or trauma, patients are typically transported by ambulance to a hospital or similar receiving location. Transport by ambulance can be acceptable when there are only one or two patients, as is the intended design for such a vehicle. However, transporting large numbers of patients can be expensive and time consuming with the limited capability of an ambulance or small vehicle. In disaster situations, or with mass evacuation of patients, the lack of ambulance transport can become problematic, at the least. For example, during hurricane Katrina, the city of New Orleans was unable to effectively evacuate their walking population, let alone those requiring special assistance. Similarly, many cities that were able to evacuate before a hurricane were ineffective when it came to evacuating hospitals in an emergency situation. Hospitals and other agencies face the same difficulty when evacuating or transporting large numbers of stable but non-ambulatory patients.

Thus, a need exists for an efficient and cost effective mass casualty transport device, system, method, and kit.

SUMMARY OF THE INVENTION

According to various embodiments, the present teachings include a framework for supporting stretchers comprising. The framework can include a sub-frame comprising an adjustable length header bar assembly and adjustable height outer frame legs connected to opposing ends of the header bar assembly; a secondary stretcher support laterally interior of and parallel with each outer frame leg; a stretcher holder connected to each of the outer frame leg and secondary stretcher support at corresponding selected heights; and interframe connectors transversely positioned between pairs of sub-frames and pairs of secondary stretcher supports; wherein stretcher handles seat in the stretcher holder and the secondary stretcher support.

According to various embodiments, the present teachings include a vehicle conversion kit. The kit can include a framework custom fit within floor, ceiling and side walls of a mass transit vehicle, the framework configured to accommodate selectively removed vehicle seats; stretcher supports positioned on said framework; tools for assembling the framework; assembly instructions; and a crate for storing and transporting at least the framework, supports, tools, and assembly instructions.

According to various embodiments, the present teachings can include a method of assembling a conversion kit in a mass transit vehicle. The method can include determining space required to assemble the conversion kit and a corresponding number of frames to be installed for that space; selectively removing seats from the vehicle; assembling a sub-frame; selectively securing the sub-frame against vehicle ceiling and side walls; connecting sub-frames with interframe connectors; and installing secondary stretcher supports coupled to the sub-frame and inset from outer ends thereof, the inset configured to accommodate a stretcher between outer ends of the sub-frame and the secondary stretcher supports.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 9 is a perspective view of a bus stretcher conversion kit and components, in accordance with embodiments of the present teachings.

DETAILED DESCRIPTION

Reference will now be made in detail to exemplary embodiments of the invention, examples of which are illustrated in the accompanying drawings. However, one of ordinary skill in the art would readily recognize that the same principles are equally applicable to, and can be implemented in devices other than a bus conversion, and that any such variations do not depart from the true spirit and scope of the present invention.

Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents. Wherever possible, the same reference numbers will be used throughout the drawings to refer to the same or like parts.

Figure 1:
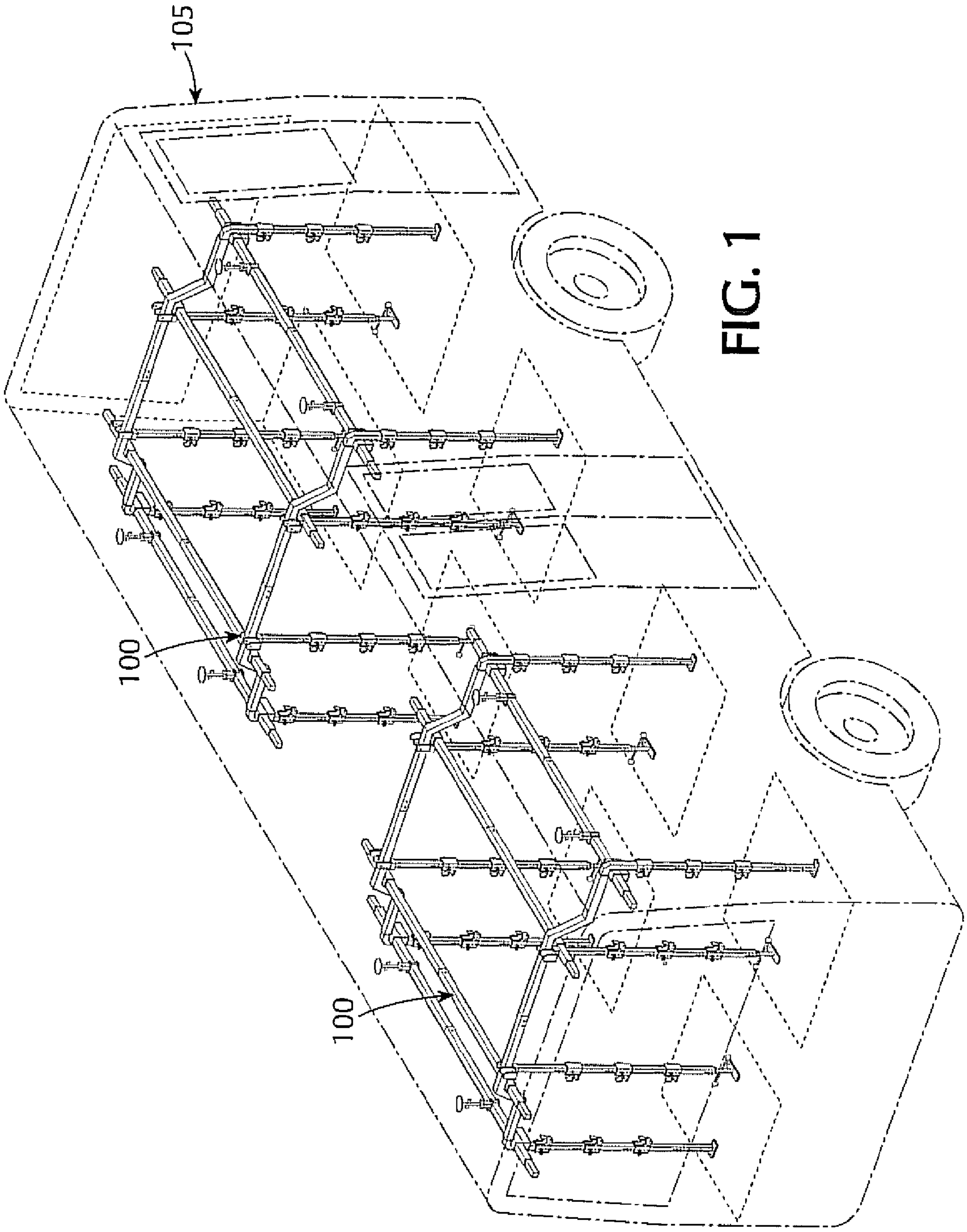
FIG. 1 is a perspective view of an assembled conversion kit installed on a bus in accordance with embodiments of the present teachings.

FIG. 1 is a perspective view of an assembled conversion kit 100 installed on a bus 105, in accordance with embodiments of the present teachings. It should be readily apparent to those skilled in the art that FIG. 1 is exemplary and that other elements can be added, removed or modified without departing from the scope of the exemplary embodiments.

The assembled conversion kit 100 is an effective and efficient solution for mass evacuation and transport of special needs patients, casualties, and others who require non-ambulatory transport. The conversion kit 100 can quickly and easily retrofit buses into mass casualty transport vehicles. All or part of one or more conversion kits can be used for a particular configuration and application. For example, with only one palletized kit (two frames), an existing passenger bus 105 can be converted into an ambulance bus capable of safely transporting eighteen stretchers and intravenous devices (IV's) along with six operators and their medical support equipment. A rugged and palletized crate allows for quick and simple logistics for pre-positioning and emergency response. The kit is all-inclusive requiring no additional tools for assembly.

Although several examples herein refer to assembly of the kit in a mobile environment such as a bus, it will be appreciated that the conversion kit is equally applicable to stationary environments such as homes, hospitals, funeral homes, etc. In any case, the conversion kit can be assembled to be a permanent or temporary fixture.

Two frames are included in each kit 100. Each frame can hold up to nine stretchers. The number of stretchers installed into a converted bus can depend upon the installation configuration used. Factors like the type of bus/vehicle, space between stretchers, aisle space to bring patients into the bus/vehicle and whether seats will be left in the bus/vehicle determine the number of stretchers that can be used in an installation.

Figure 2:
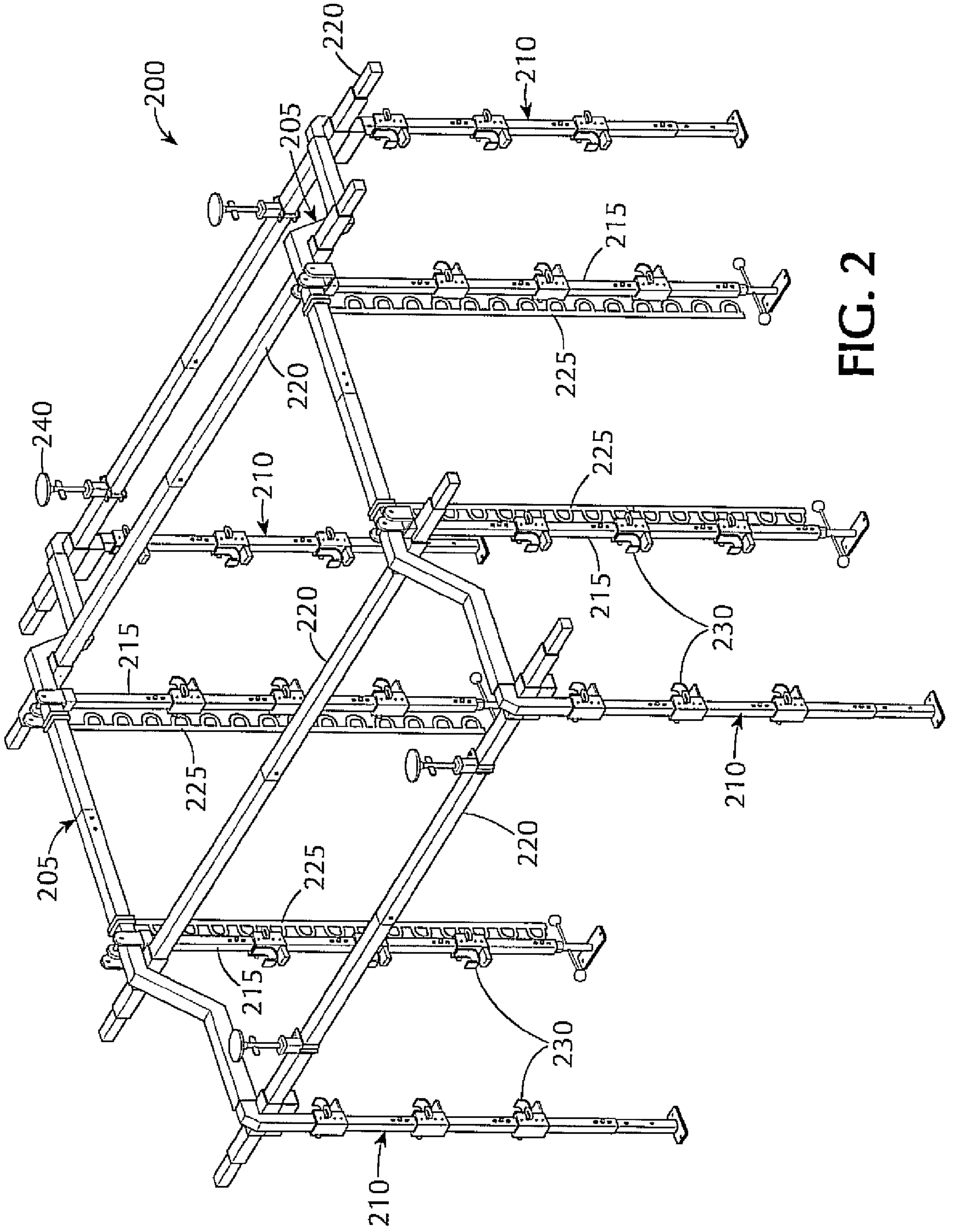
FIG. 2 is a perspective view of an assembled conversion kit in accordance with embodiments of the present teachings in accordance with embodiments of the present teachings.

FIG. 2 is a perspective view of one frame 200 of an assembled conversion kit in accordance with embodiments of the present teachings in accordance with embodiments of the present teachings. It should be readily apparent to those skilled in the art that FIG. 2 is exemplary and that other elements can be added, removed or modified without departing from the scope of the exemplary embodiments.

In general, a frame 200 can include two header bar assemblies 205, four outer frame legs 210, four support legs 215, four horizontal inter-frame connectors 220, suspended stretcher straps 225, a weight bearing arm (not shown in FIG. 2) for temporarily supporting a portion of a stretcher (not shown in FIG. 2), and support mounts 240 for the ceiling. In the figures, the outer frame legs 210 are vertically oriented, a pair supporting opposing ends of the header bar assembly 205. The outer frame leg 210 can include an upper L-shaped end 210*a* and a base end 210*b*. The base end 210*b* can be in the shape of a bottom plate as depicted in FIG. 3G. The upper L-shaped end 210*a* is an extension of the outer frame leg 210, is substantially perpendicular to the remainder of the outer frame leg 210, and is hollow to receive a portion of the header bar assembly 205 as will be further described. The suspended stretcher straps 225 can be suspended from the header bar assembly 205, with a pair of suspended stretchers straps 225 for each header bar assembly 205 as shown. The support legs 215 can be positioned to further support the header bar assembly 205 proximate the flexible stretcher supports 225. The horizontal inter-frame connector 220 can be positioned at an intersection of the header bar assembly 205 and the outer frame legs 210 in a first instance, and at a position of the support legs 215/suspended stretcher straps 225 as shown.

The suspended stretcher straps 225 can be formed of nylon or other suitable high strength material. For example, the suspended stretcher straps can include nylon strapping with ultra-light straight Carabineer. Each suspended stretcher strap 225 can include a number of loops 226 spaced along a length of the stretcher strap. The loops 226 can be sewn on or woven into the fabric of the stretcher strap 225, and have an opening of the loop of a size to accommodate a handle of a stretcher therein. The stretcher strap 225 can be of a material that is relatively non-slip. The stretcher strap 225 can be attached to the header bar assembly 205 by inserting one end of the stretcher support through a loop in an opposite end of the stretcher strap and tightening against the header bar assembly 205. Because of the simple attachment, the stretcher strap 225 can be positioned at any point on the length of the header bar assembly 205.

Referring now to FIGS. 3A through 3L, detail of several components of the framed 200 are shown and described in further detail. It should be readily apparent to those skilled in the art that FIGS. 3A through 3L are exemplary and that other elements can be added, removed or modified without departing from the scope of the exemplary embodiments.

Figure 3A:
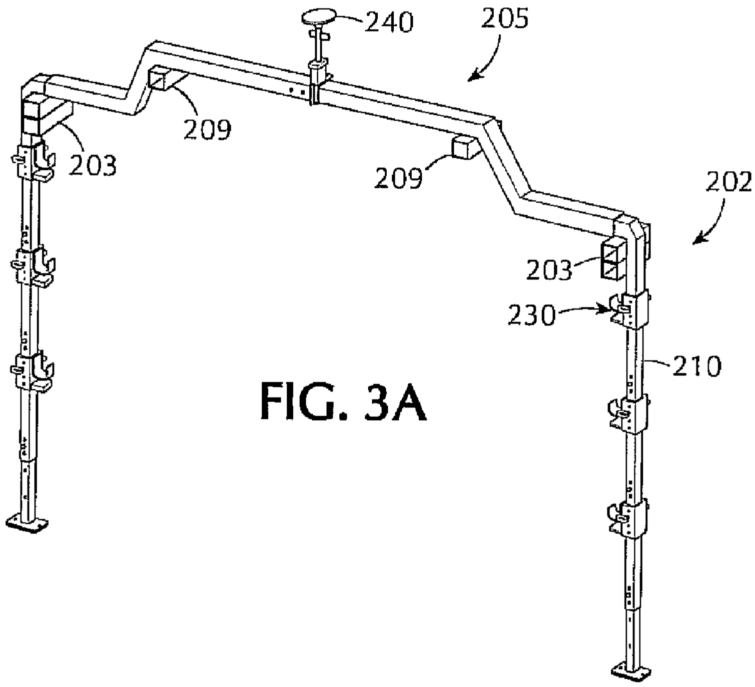
FIG. 3A is a perspective view of a sub-frame in accordance with embodiments of the present teachings.
Figure 3C:
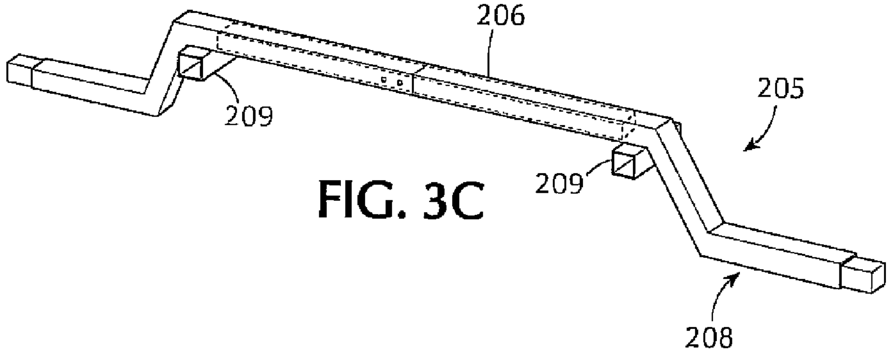
FIG. 3C is a perspective view of an assembled header bar for frame end in accordance with embodiments of the present teachings.
Figure 3D:
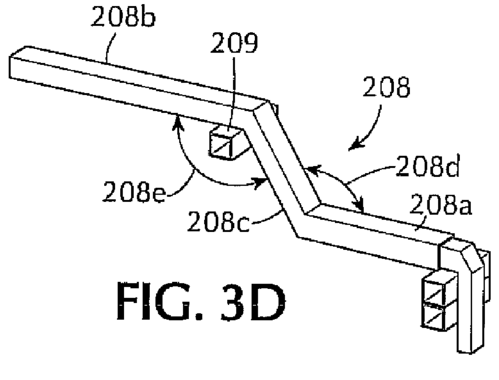
FIG. 3D is a perspective view of a an angled header bar component of the assembled header bar in accordance with embodiments of the present teachings.

FIG. 3A is a perspective view of a sub-frame 202, as it can appear in a first stage of assembly of the frame 200. The sub-frame 202 can define one end of the assembled frame 200. At this stage of assembly, the sub-frame 202 can include a pair of outer frame legs 210, the header bar assembly 205, and ceiling pressure mount 240 on the header bar assembly 205. In addition, a number of stretcher holders 230 are shown mounted on each of the outer frame legs 210. Stretcher holders 230 can also be mounted on each of the support legs 215, and the description of stretcher holders 230 in connection with the outer frame legs 210 is intended to include their position and function in connection with the support legs 215. Stretcher holders 230 can be vertically spaced over a height of the outer frame leg 210, and in alignment with corresponding stretcher holders 230 on the support leg 215 and/or loops formed in the flexible stretcher support 225. The outer frame leg 210 can include a frame dual sleeve 203. The dual sleeve 203 can be configured as a pair of tubular shells, through which a horizontal inter-frame connector 220 can be inserted as will be further described. The dual sleeve 203 can be welded, bolted, formed as a one-piece structure with, or otherwise connected to the outer frame leg 210 in the location shown.

Figure 3B:
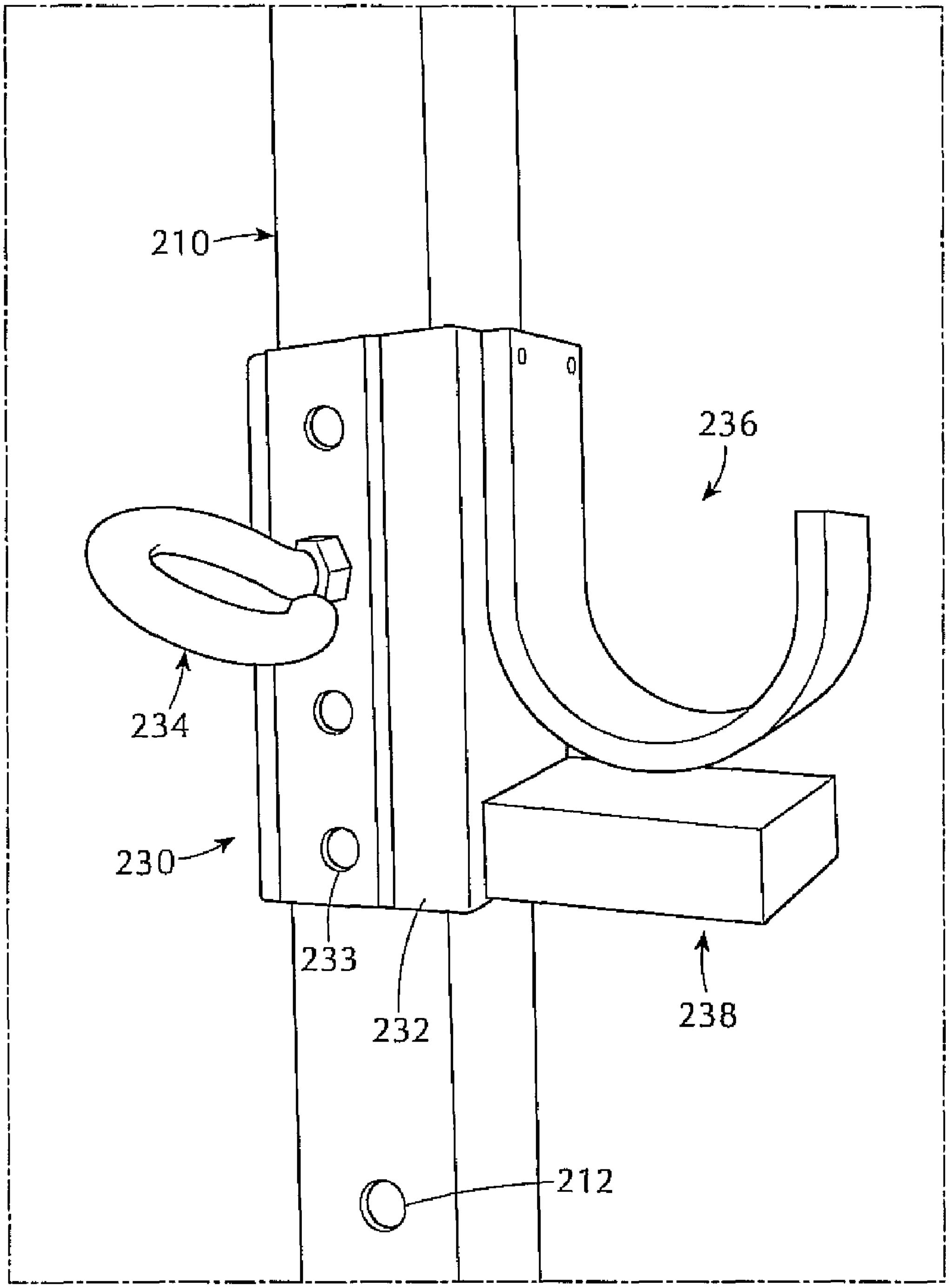
FIG. 3B is a perspective, detailed view of a stretcher holder in accordance with embodiments of the present teachings.

FIG. 3B is a perspective, detailed view of a stretcher holder 230 in accordance with embodiments of the present teachings. The stretcher holder 230 can include a substantially tubular frame 232, a lag eye bolt 234 for attaching the tubular frame portion 232 to the frame leg 210, a support hook 236, and an anchor bar 238.

The tubular frame 232 of the stretcher holder 230 can be of a size to slide over the frame leg 210, and include threaded apertures 233 aligned with threaded apertures 212 of the frame leg 210. In the figure, four such threaded apertures 233 are depicted, but any suitable number of threaded apertures is contemplated. The lag eye bolt 234 can include a threaded end which is of a length to secure through the threaded apertures 233 of the tubular frame 232 and into the threaded apertures 212 of the frame leg 210. The support hook 236 can be integrally attached to the tubular frame 232, by a one piece construction therewith, welding, bolts, or the other suitable secure connection. The support hook 236 can be of a size to receive a handle of a stretcher, and support the same securely therein. In addition, the support hook 236 can include a liner on an exposed surface thereof. The liner can include rubber or other non-slip material as known in the art. The anchor bar 238 can be positioned below the support hook 236 and can extend from the frame leg 210 by a distance suitable to leverage a weight bearing arm (FIG. 3F) coupled thereto. When the lag eye bolt 234 is loosened or removed from the threaded aperture 233, the tubular frame 232 can be slid up and down the frame leg 210 to a desired position, and then secured at that position by tightening the lag eye bolt 234 through the aligned threaded apertures 233 and 212.

FIG. 3C is a perspective view of an assembled header bar 205 for frame end in accordance with embodiments of the present teachings. The header bar assembly 205 can include a header support bar 206 and an angled support bar on opposing ends of the header support bar 208. FIG. 3D depicts detail of an angled support bar portion of the assembled header bar 205. The header support bar 206 is an internal bar of a length approximately equal to a span of the header bar assembly 205 between the angled header bars 208.

The angled header bar 208 can include first 208*a* and second 208*b* sections, which when assembled, are substantially perpendicular to the outer frame leg 210, and a third section 208*c* angled between the first 208*a* and second 208*b* sections to define an obtuse angle at an outside angle 208*d* between the first 208*a* and third 208*c* sections and an obtuse angle at an inside angle 208*e* between the second 208*b* and third 208*c* sections.

The second sections 208*b* of angled header bars 208 can be configured to slide over the support bar 206 to a point where facing ends of the second sections 208*b* can abut. Similarly, the facing ends of the second sections 208*b* can be slid outwards on the support bar 206 to extend an overall length of the header bar assembly 205, and in order to accommodate a wider spacing of outer frame legs 210. Outer ends of the first sections 208*a* of the angled header bar 208 can be configured to slide within the hollow portion of the L-shaped upper end 210*a* of the outer frame leg 210.

In the detail of the angled header bar 208 as depicted in FIG. 3D, the angled header bar 208 can include a frame sleeve 209. The frame sleeve 209 is positioned on the second section 208*b* at a juncture of the inner angle 208*e*. The frame sleeve 209 can be configured as a tubular shell, through which a horizontal inter-frame connector 220 can be inserted as will be further described. The frame sleeve 209 can be welded, bolted, formed as a one-piece structure with, or otherwise connected to the angled header bar 208 in the location shown.

Figure 3E:
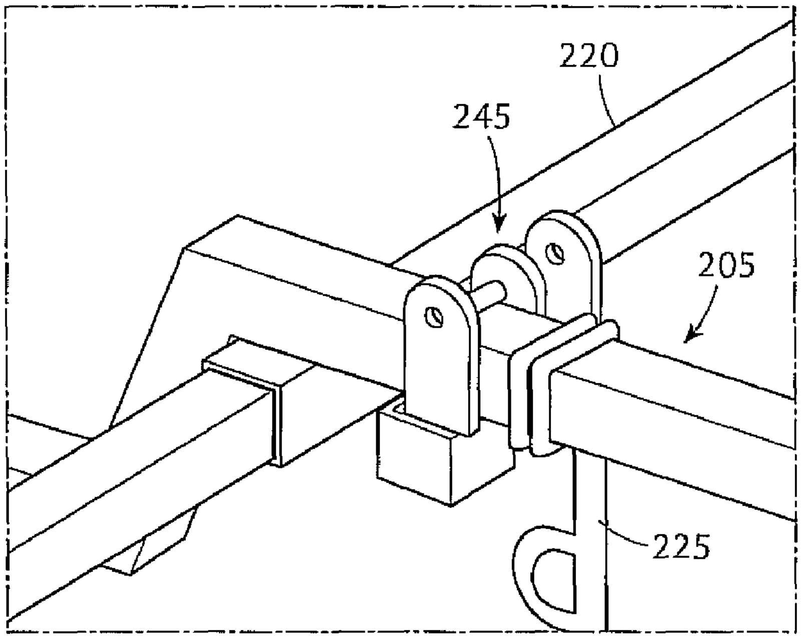
FIG. 3E is a perspective view of a mounting bracket for an angled header bar in accordance with embodiments of the present teachings.
Figure 3F:
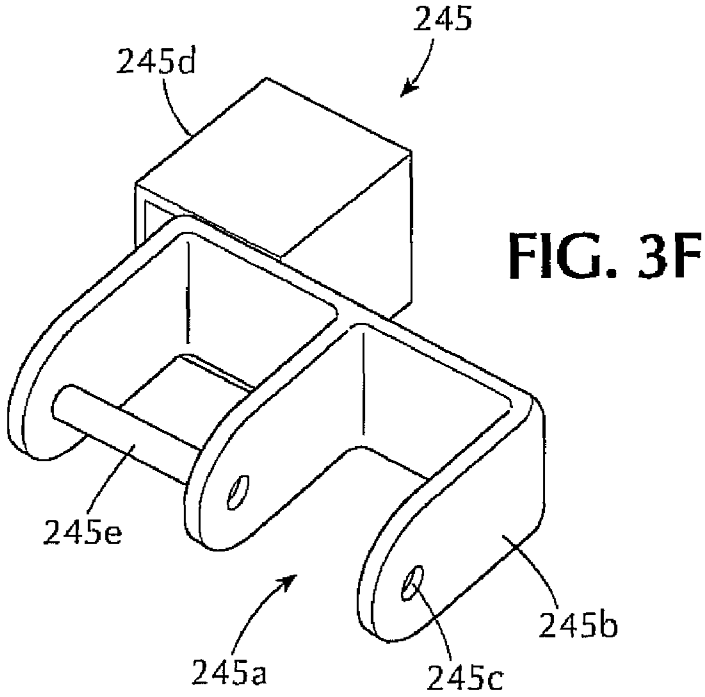
FIG. 3F is a detailed view of the mounting bracket of FIG. 3D in accordance with embodiments of the present teachings.
Figure 3G:
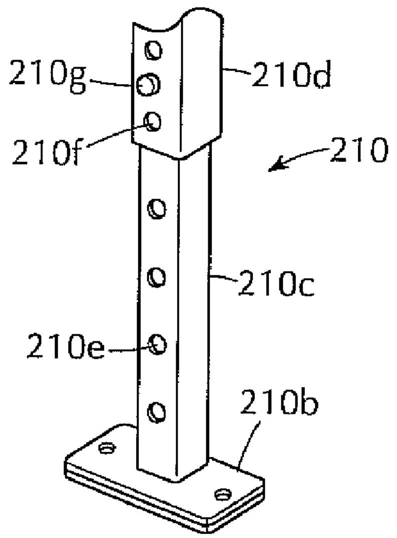
FIG. 3G is a perspective view of a leg portion of an outer frame leg in accordance with embodiments of the present teachings.

FIG. 3E is a perspective view and FIG. 3F is a corresponding detailed view of a mounting bracket 245 for an angled header bar assembly 205 in accordance with embodiments of the present teachings. The mounting bracket 245 can include a pair of U-shaped openings 245*a* defined by legs 245*b*, with a common leg between the openings 245*a*, and apertures 245*c* adjacent distal ends of the legs 245*b*, and a tubular sleeve 245*d* fixed to an outer wall of one of the legs 245*b*. A pin 245*e* can be inserted through a pair of the apertures 245*c* to secure the mounting bracket 245 to the header bar assembly 205 (see FIG. 3E). As depicted, the mounting bracket 245 can be positioned laterally inside of the frame sleeve 209. Because the mounting bracket 245 has two U-shaped openings 245*a*, the bracket 245 can have more than one positioning option.

FIG. 3G is a detailed view of a portion of an outer frame leg 210 in accordance with embodiments of the present teachings. The outer frame leg 210 can include the base end 210*b* as described above, an inner leg 210*c* and an outer leg 210*d* slidable relative to the inner leg 210*c*. It will be appreciated that either of the inner leg 210*c* or the outer leg 210*d* can be that connected to the base 210*b*, and such is not intended to be limiting herein. The inner leg 210*c* can include openings 210*e* therein and the outer leg 210*d* can include openings 210*f* therein. By sliding the inner leg 210*c* and the outer leg 210*d* relative to each other, openings 210*c* and 210*f* can be aligned while configuring an overall height of the outer frame leg 210. Upon establishing a height of the outer frame leg 210 and aligning corresponding openings 210*e*, 210*f*, a bolt 210*g* or similar securing component can be inserted through the openings to lock the outer frame leg 210 at the established height. Each of the outer frame legs 210 can be similarly adjusted as need within a converted bus.

Figure 3H:
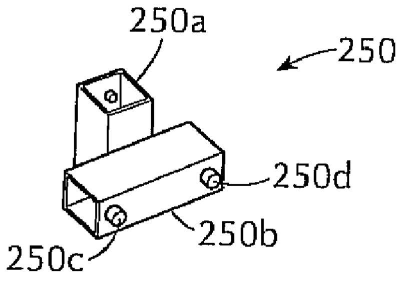
FIG. 3H is a perspective view of an interframe connector mountable on the outer frame leg in accordance with embodiments of the present teachings.

FIG. 3H is a perspective view of an interframe connector mount 250 positionable on the outer frame leg 210 in accordance with embodiments of the present teachings. The interframe connector mount 250 can include a first sleeve 250*a* slidable over the frame leg 210 and a second sleeve 250*b* transverse to the first sleeve. Each of the first and second sleeves 250*a*, 250*b* can include threaded openings 250*c* through which bolts 250*d* or the like can be inserted. The interframe connector mount 250 can be used when the normal frame sleeve openings on the outer frame leg 210 are obstructed and cannot be utilized. An example would be if a ceiling mounted air conditioning unit prevents the horizontal inter-frame connector 220 frame sleeve on the outer frame leg 210 from matching up.

Figure 3I:
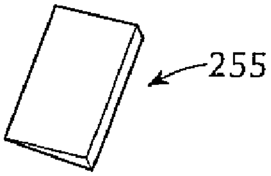
FIG. 3I is a perspective view of a wedge for adjusting a level of the outer frame leg in accordance with embodiments of the present teachings.

FIG. 3I is a perspective view of a wedge 255 for adjusting a level of the outer frame leg in accordance with embodiments of the present teachings. The wedge 255 can be inserted below the base 210*b* in the event of the base plate 210 is seated on an incline of the floor, such as would occur on a wheel well or the like. The wedge can be a solid, unyielding material or it can be a resilient material, such as rubber, including a hard rubber. A spray adhesive can be used on the wedge 255 to increase its friction and hold against slipping.

Figure 3J:
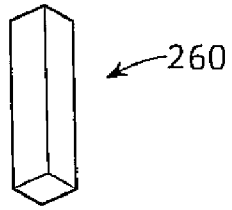
FIG. 3J is a perspective view of a fitted insert for the outer frame leg in accordance with embodiments of the present teachings.

FIG. 3J is a perspective view of a fitted insert 260 for the outer frame leg 210 in accordance with embodiments of the present teachings. The fitted insert 260 can be slid onto the support leg 210, and with an adjustable height screw, adjustments can be made to the mounting height of the stretcher holders 230.

Figure 3K:
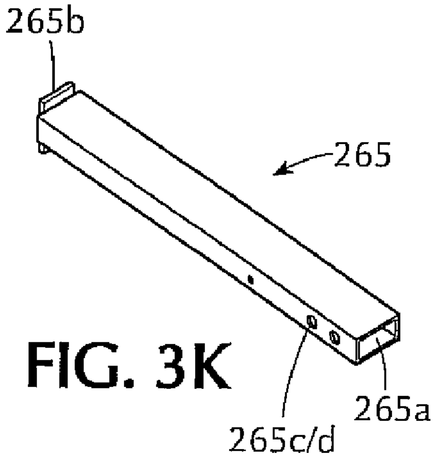
FIG. 3K is a perspective view of a weight bearing arm connectable to the outer frame leg in accordance with embodiments of the present teachings.

FIG. 3K is a perspective view of a weight bearing arm 265 connectable to the outer frame leg in accordance with embodiments of the present teachings. The weight bearing arm 265 can include an open end 265*a* and an outer end 265*b*. The open end 265*a* is of a dimension to slide over the anchor bar 238 of the mounting bracket 210. The inner dimension of the open end 265*a* can correspond to the outer dimension of the anchor bar 238 to the extent that the components are slidable yet relatively secure. A release button 265*c* can be inserted through an aperture 265*d* in a side wall of the weight bearing arm 264 and into a corresponding aperture 238*a* of the anchor bar 238, in order to further secure the components together. By pressing on the release button 265*c*, the weight bearing arm 265 can be released from the anchor bar 238. The outer end 265*b* can include a flange of a greater diameter or cross section than that of the weight bearing arm 265. As such, a stretcher handle temporarily resting on the weight bearing arm can be prevented from sliding off the outer end thereof.

Figure 3L:
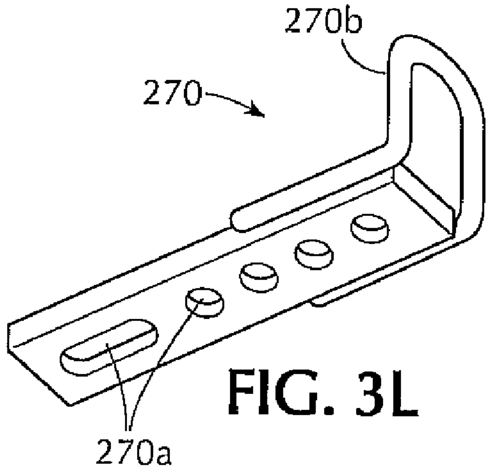
FIG. 3L is a perspective view of an anchor plate in accordance with embodiments of the present teachings.

FIG. 3L is a perspective view of an anchor plate 270 in accordance with embodiments of the present teachings. The anchor plate 270 can include bolt holes 270*a* and a free loop 270*b*. The bolt holes 270*a* can be aligned with holes left in the bus floor in the seat removal process. Using the bolts from the bus seats, the anchor plate 270 can be secured, through the bolt holes 270*a*, to the vehicle floor. By securing the anchor plate 270 at only one of the bolt holes 270*a* the anchor plate 270 can pivot towards the stretcher strap 225, enabling a taut connection of the stretcher strap between the ceiling and the anchor plate 270.

Figure 4:
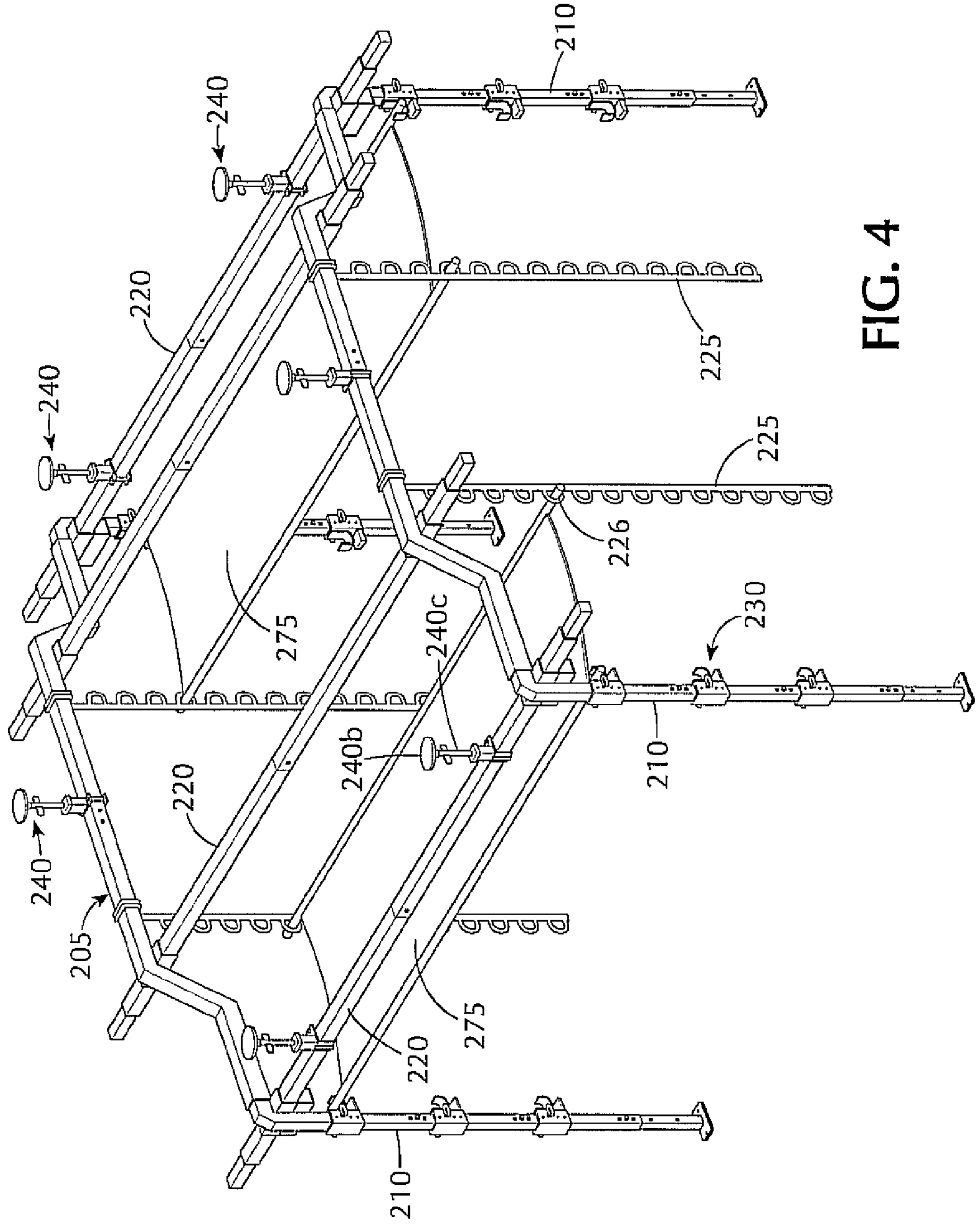
FIG. 4 is a perspective view of an assembled bus stretcher conversion kit supporting two stretchers in accordance with embodiments of the present teachings.

FIG. 4 is a perspective view of an assembled bus stretcher conversion kit 200 supporting two stretchers 275 in accordance with embodiments of the present teachings. The stretcher 275 can include handles as known in the art, the handles seated in the 236 of the mounting bracket 230 and in a loop 226 of the stretcher strap 225.

The figure also more clearly depicts exemplary positions of the ceiling pressure mount 240 on the assembled frame 200. The ceiling pressure mount 240 can include a connector 240*a* and a plate 240*b* with a shaft 240 threadable or otherwise adjustably inserted into the connector 240*a*. The connector 240*a* is of a configuration to either clamp or slide over the header bar assembly 205 or the horizontal interframe connector bars 220.

Figure 5:
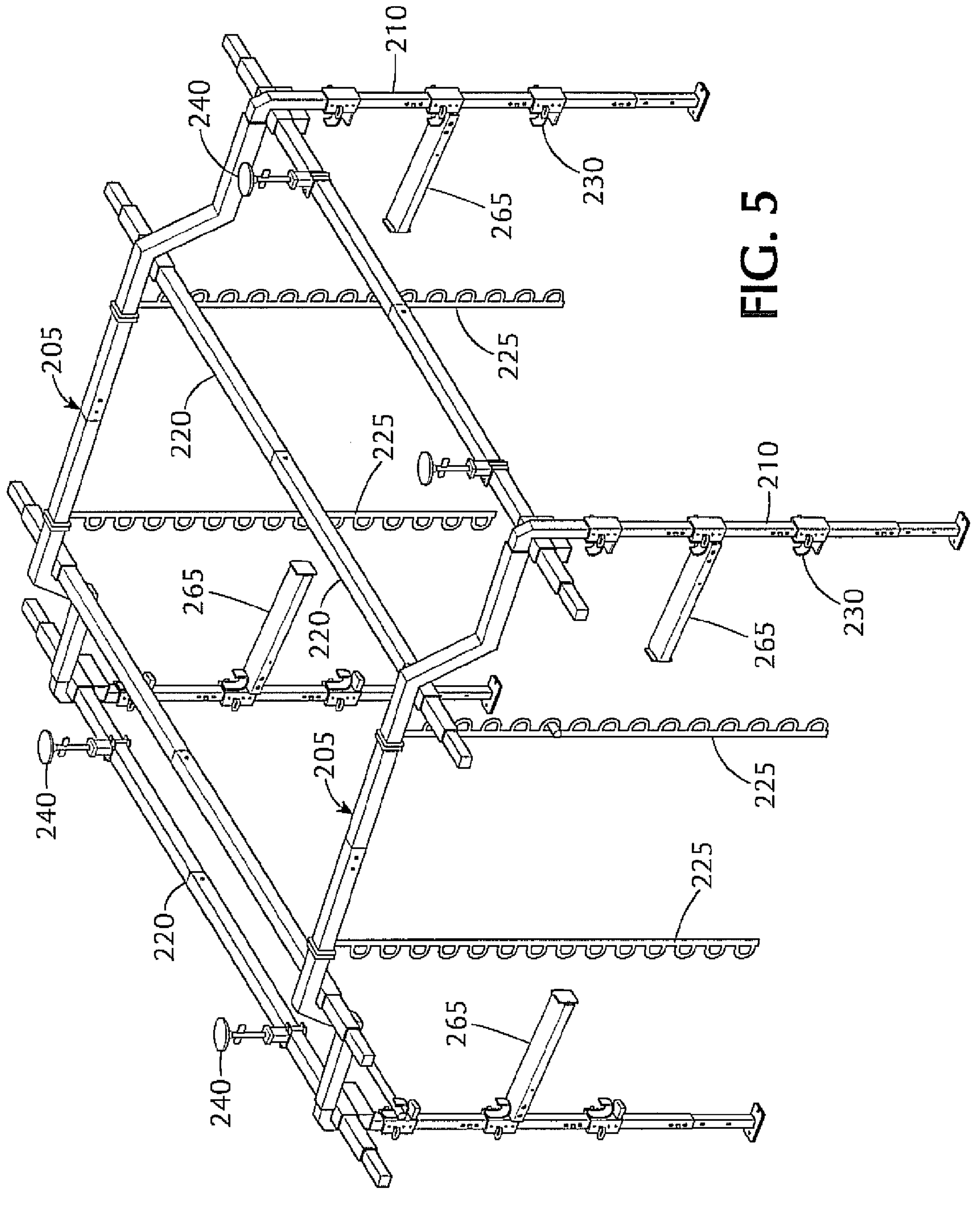
FIG. 5 is a perspective view of an assembled bus stretcher conversion kit having weight bearing arms mounted thereon in accordance with embodiments of the present teachings.

FIG. 5 is a perspective view of an assembled bus stretcher conversion kit 200 having weight bearing arms 265 mounted on each of four outer frame legs 210 in accordance with embodiments of the present teachings. As previously described, the weight bearing arms 265 can be used to support a stretcher handle prior to loading the stretcher handle into one or both of the mounting bracket 230 and the loop 226 of the stretcher strap 225. Remaining components are common to those previously described and will not be repeated for the sake of brevity, but are intended to be included within the depicted exemplary embodiment.

Figure 6:
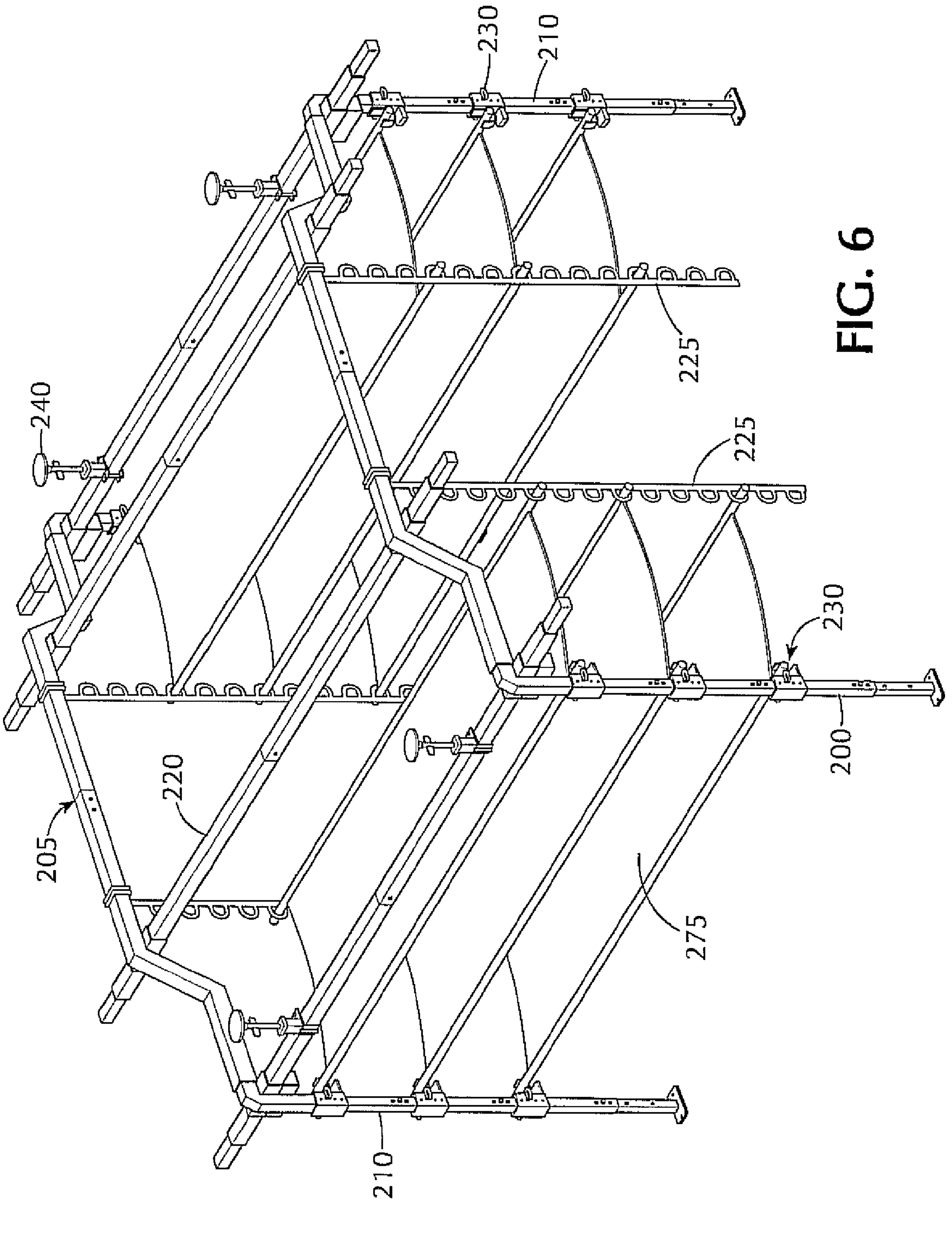
FIG. 6 is a perspective view of an assembled bus stretcher conversion kit supporting multiple stretchers in accordance with embodiments of the present teachings.

FIG. 6 is a perspective view of an assembled bus stretcher conversion kit 200 supporting multiple stretchers 275 in accordance with embodiments of the present teachings. Remaining components are common to those previously described and will not be repeated for the sake of brevity, but are intended to be included within the depicted exemplary embodiment.

Figure 7:
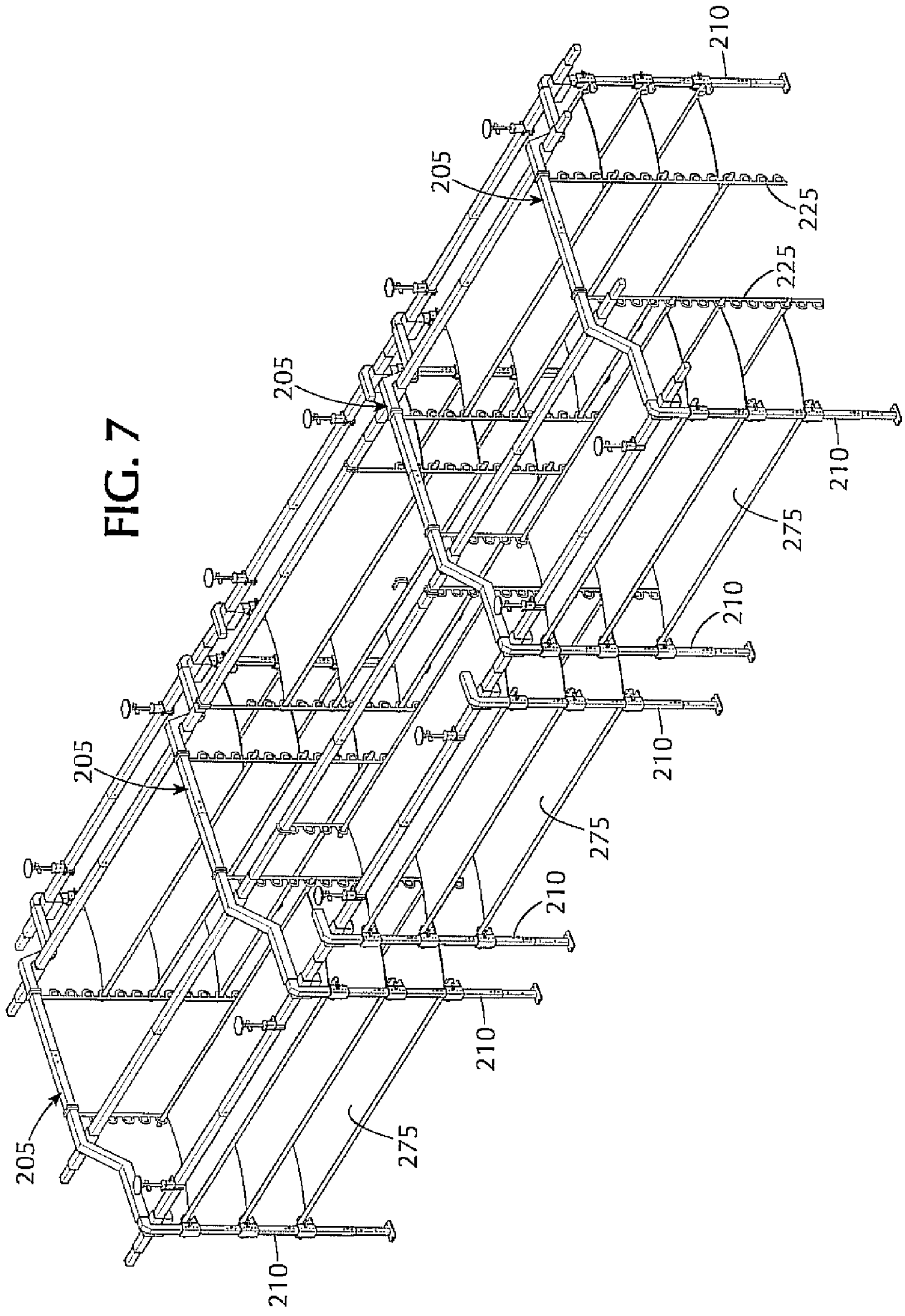
FIG. 7 is a perspective view of multiple assembled bus stretcher conversion kits, each supporting multiple stretchers in accordance with embodiments of the present teachings.

FIG. 7 is a perspective view of multiple assembled bus stretcher conversion kits 200, each supporting multiple stretchers 275 in accordance with embodiments of the present teachings. Remaining components are common to those previously described and will not be repeated for the sake of brevity, but are intended to be included within the depicted exemplary embodiment.

Figure 8:
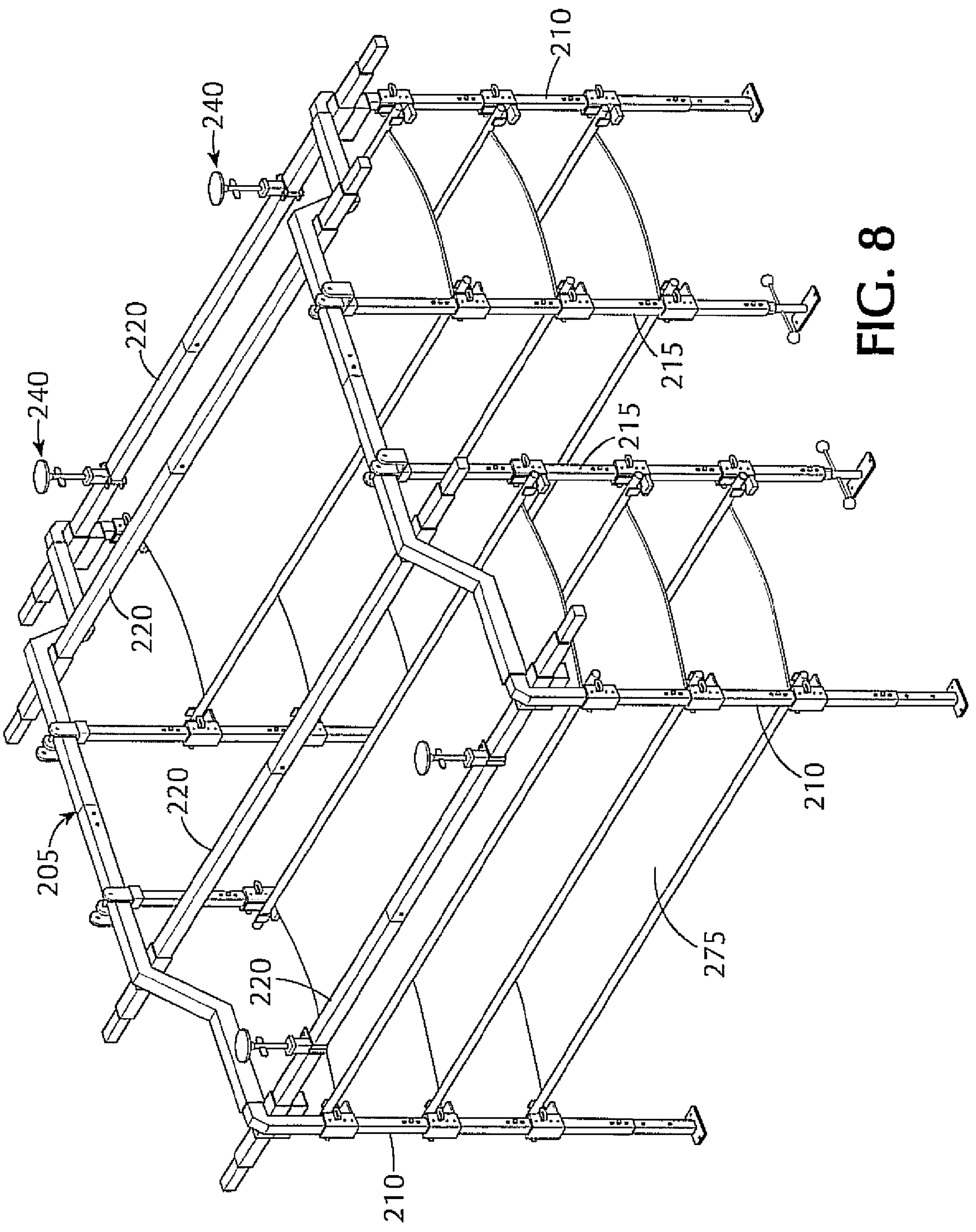
FIG. 8 is a perspective view of an assembled bus stretcher conversion kit in a free-standing configuration in accordance with embodiments of the present teachings.

FIG. 8 is a perspective view of an assembled bus stretcher conversion kit 200 in a free-standing configuration in accordance with embodiments of the present teachings. In the exemplary configuration, the stretcher straps are removed in favor of the support legs 215. The support legs 215 can be used alone when the kit is assembled in the free standing configuration shown. This free-standing configuration can be used in a bunk house or other temporary shelter.

FIG. 9 is a perspective view of a bus stretcher conversion kit 900, including components and packing list 902, in accordance with embodiments of the present teachings. The kit 900 can be transported and stored in a storage crate 980. The dimensions of the storage crate can have a width of 72", a depth of 32" and a height of 31". Crates 980 can be stacked up to six crates high. The storage crate 980 can be palletized to allow for easy transport, movement, and storage. A weight of a bus conversion kit with storage crate is about 840 lbs.

The kit 900 can include some additional components not separately described above. Specifically, the kit 900 can include, plastic end caps 904 to cover exposed ends of components, a box of accessories 906 including installation tools, a header bar cover, and rubber bolt covers, a bracket connector 908 for connecting the frame to the wall support mount, and a bracket connector 910 for connecting the frame to the ceiling pressure mount. The header bar cover can surround the horizontal inter-frame connector bars. The rubber bolt covers can cover exposed ends of bolts used in assembly.

In the above exemplary embodiments, the frame components can be made of zinc coated structural steel, aircraft aluminum, or the like. Zinc coating of the frame can allow for long-term storage without rusting. The parts are not powder-coated because powder-coated parts must be handled carefully or they will scratch and start to rust.

The bus conversion kit accepts most known stretchers 275 including most standard NATO stretchers used by the US Military and first responders. These stretchers typically have a handle with a 1.5" diameter.

A standard 40 foot 50 passenger school bus, or similar transit bus can be retrofitted with one bus conversion kit (two frames), to transport up to twelve non-ambulatory patients. This installation configuration allows for some seats to remain on the bus to allow for medical personnel to travel with the patients. An alternative solution is to remove all of the seats and install 1½ bus conversion kits (three frames) for the ability to transport up to eighteen patients. The bus conversion kit can also be installed without having to remove the existing bus seats based on the configuration or assembly used. The limitation in the number of patients is based on space available between patients when stretchers are installed. It will be appreciated that the exemplary components herein uniquely lend themselves to any variety of configurations, for example using parts or all of one or more kits, including the frames, supports, sub-frames, etc. therein.

It is intended that the kit be modular in nature to enable temporary or permanent setup in virtually any size of large vehicle, and according to seats and other equipment that may need to remain in the vehicle. In addition, a kit, and/or components of one or more kits can be temporarily or permanently assembled, for example in a hospital, barracks, home, funeral home or virtually any similar environment. Even further, it is expected that the kit and/or components of one or more kits can be assembled, either temporarily or permanently in a cargo hold, transport crate, or the like. As such, the framework can be used free standing as well as without ceiling and wall pressure mounts. Frameworks from part or all of one or more kits can be assembled, for example, to handle surge capacity issues at hospitals or medical facilities, for example if the H1N1 flu expanded and created a pandemic, medical facilities would be overwhelmed and the kit can be used to hold patients either in isolation or supplement current hospital beds. In addition the framework can be installed inside of a CONEX container for transport of patients or for mortuary affairs. The types of environments available to receive assembled frameworks is limitless, including for example, busses, trucks, containers, planes, etc. Any examples given herein are not intended to be limiting.

The bus conversion kits can be stored at strategic locations where installation into buses or other vehicles can be accomplished. Some local governments have stored bus conversion kits at bus depots. The bus conversion kits should be stored in a facility that will keep the bus conversion kit/crate out of the natural elements. The crates are constructed of wood and should be kept in a facility that is free of termite and wood-eating insects.

The bus conversion kit was designed for long-term storage and shelf-life. However, a yearly inspection and parts inventory of the bus conversion kit should be performed. All the moving parts should be lubricated if the lubricant has dried out. The attached nuts and bolts should be lubricated and checked to make sure they are not missing from the bus conversion kit frame parts.

The bus conversion kit comes with pictorial instructions an Installation Tool Kit that includes all the hand tools necessary to install the bus conversion kit. Power tools can also be used to assemble the bus conversion kit; however caution should be given to prevent over-tightening. Once the seats are removed from the bus, it can take two people one hour to install the two frames of the bus conversion kit. Seat removal (depending on the assembly configuration) can takes 45 minutes to 2 hours to complete depending on the type of bus, number of seats, number of workers, and past experience removing bus seats.

The bus conversion kit can expands in length, width and height for installation into most types of school buses, transit buses, shipping containers, moving vehicles (i.e. U-Haul), or any other vehicles of opportunities. Installation is constrained to the min/max dimensions provided on the bus conversion kit frame dimensions page. Custom installations can also be accomplished.

It is not necessary to drill any holes into the bus or vehicle to install the frame. The frames have pressure fittings that allow it to be installed without drilling any holes. This ensures that the vehicle can be returned to its original use without damage. The bus conversion kit can be disassembled and put back into storage for multiple uses. The bus or vehicle that is used can also be converted back to its original purpose.

The bus conversion kit comes with extra parts which makes it possible to install in various vehicle makes and models. Not all pieces are used in all configurations.

Figure 10A:
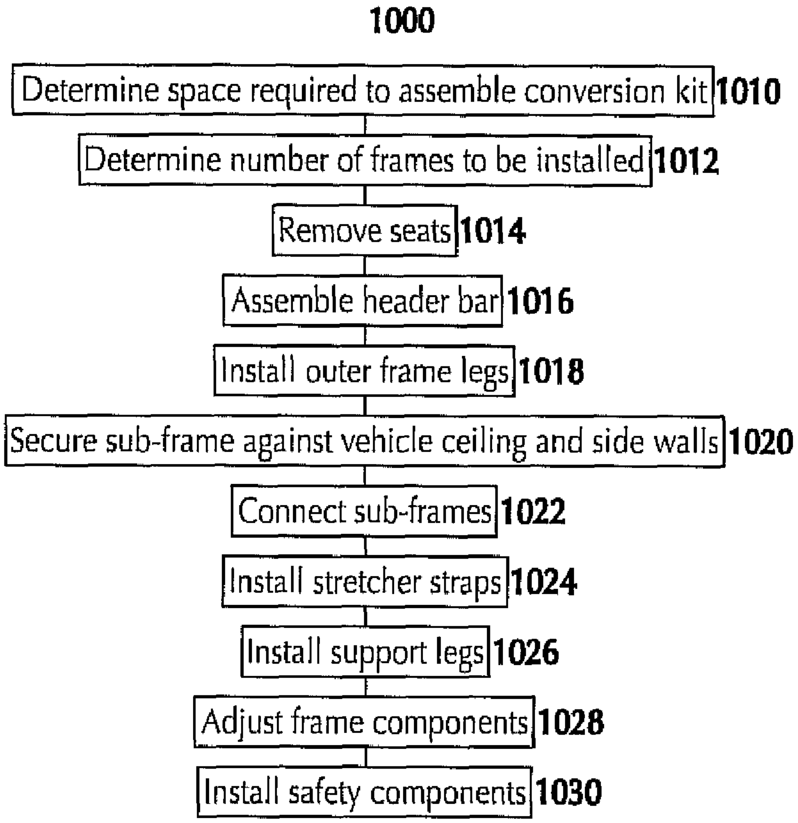
FIGS. 10A through 10C depict a method of assembling the bus stretcher conversion kit in accordance with embodiments of the present teachings.

FIG. 10 depicts a method for assembling the bus stretcher conversion kit in accordance with embodiments of the present teachings. It should be readily apparent to those skilled in the art that method of FIG. 10 is exemplary and that other steps can be added, removed or modified without departing from the scope of the exemplary embodiments.

Prior to Installing the bus stretcher conversion kit, the vehicle is prepared. Preparing the vehicle can include determining the space required to assemble the conversion kit at 1010; determining how many frames will be installed at 1012; and removing seats at 1014.

Determining how many frames will be installed can include measuring the stretcher length and measuring the floor space at. The stretcher length corresponds to the frame length. Measurement is the length of the stretcher with the stretcher handles extended. Enough space should be left for the handling of stretchers and patients between each frame.

Seat removal can include, for each frame to be installed, removing enough seats to enable fitting the length of the stretcher measured. At this step, undo the seats from the bus floor by disconnecting the fasteners (i.e., bolts or latches). The box of accessories and installation tools each have tools to assist in the seat removal process. Remove seats and, if applicable, replace bolts removed in the hole in the floor. All fasteners (i.e., nuts and bolts) can be saved for the reassembly of the bus.

Assembling the frame can include assembling a header bar at 1016; installing outer frame legs at 1018, the header bar and frame legs defining a sub-frame; securing the sub-frame against a ceiling and side walls of the vehicle at 1020; connecting sub-frames together at 1022; installing stretcher straps at 1024; installing support legs at 1026; adjusting frame components at 1028; and installing safety components at 1030.

Assembling the header bar can include connecting two angled header bars with a header support bar; and lightly tightening bolts to secure the header support bar. The header support bar comes inserted in an angled header. The frame width can be adjusted by the header bar assembly. Each frame requires two header bar assemblies.

Once the header bar assembly is complete, installing the outer frame legs can include inserting one outer frame leg into one side of the header bar assembly; firmly tightening bolts to secure the angled header bar to the outer frame leg; standing the partially assembled outer frame leg and header bar assembly in an upright position; and inserting and securing a second outer frame leg to the other side of the header bar assembly.

Securing the sub-frame assembly can include attaching a ceiling pressure mount on the header support bar of the sub-frame as a temporary pressure fitting; adjusting a height on the outer frame legs (one leg at a time) to a maximum allowable height within the space in the vehicle; securing the sub-frame upright to the ceiling using the ceiling pressure mount without over tightening; and locking the sub-frame assembly in place by tightening all bolts in the header frame assembly and outer frame legs and repeat on the second sub-frame assembly at the stretcher length determined above.

The ceiling pressure mount can be utilized by inserting a frame ceiling pressure mount into the extended side of a bracket connector for the ceiling from mount to create a ceiling pressure mount; and securing the bracket connector of the ceiling pressure mount to a header support bar or horizontal inter-frame connector to push against the ceiling of the vehicle. During assembly, install as many ceiling pressure mounts as the configuration allows.

The wall support mount can be utilized by inserting the wall support mount into a bracket connector for the wall support mount; fastening the wall support mount to outer frame legs in between stretcher holders; and tightening a nut in the wall support mount to pressurize the wall support mount against the vehicle wall. It will be appreciated that ceiling pressure mounts can be used in place of wall support mounts at this step. When placing the wall support mount near window, ensure that no part of the mount is applying pressure to glass. During assembly, install as many wall support mounts as a particular configuration allows for.

Connecting sub-frames can include connecting the two sub-frames with eight horizontal inter-frame connectors; aligning frame sleeve openings on the header bar assembly and outer frame legs on two sub-frames; inserting two horizontal inter-frame connectors into the frame sleeve opening on the angled header bar of each sub-frame; connecting the horizontal inter-frame connectors between the sub-frames; selecting the frame sleeve opening on the outer frame legs avoiding obstacles (i.e., air-conditioning or doors); inserting two horizontal inter-frame connectors into the frame sleeve opening on the outer frame legs on each sub-frame; connecting horizontal inter-frame connectors between the sub-frames; and tightening nuts and bolts on the horizontal inter-frame connectors, angled header bars and outer frame legs. It will be appreciated that the horizontal inter-frame connectors connect to each other by inserting the male end of one bar into the female end of another bar. All horizontal inter-frame connectors should face in the same direction. The bolt head should always face the inside of the assembly on the horizontal inter-frame connectors.

Stretcher straps can be installed by looping stretcher straps over the angled header bar assembly and through the end loop until all loops are through; and pulling the stretcher strap until it is snug. The loops should drape down towards the floor. A Carabineer can be used to secure the stretcher strap to the anchor plate, if applicable, or anchor point (i.e., seat leg). To insert a stretcher into the stretcher holders, adjust height of the stretcher holders to level the stretcher and tighten eye bolts to secure the stretcher holders at a desired height. Stretchers can be adjusted at different angles for specific treatments and to control bodily fluids. Eye bolts can be tightened using a handle of a wrench for leverage. The stretcher holders on the outer frame legs and support legs can be arranged to hold 1, 2 or up to 3 stretchers. The stretcher can be angled to elevate the head or feet.

Support legs can be mounted and secured onto the angled header bar, near the stretcher straps. Using the mounting bracket on the support leg mount to enable the stretcher holders on the support leg to align with the outer frame legs, insert the support leg into the support leg mount. The support leg should be installed after the stretchers are loaded into the stretcher straps and always before transport. Patient loading and unloading should be done with a backboard if the kit is used as a permanent installation with stretchers and support legs fixed in place. Using an adjustable height screw on the support leg, adjust the support leg vertically.

Adjusting and securing the frame can include removing temporary ceiling pressure mounts, if applicable; and vertically adjusting the outer frame legs by telescoping the outer frame leg. The outer frame leg height can be adjusted in 1" increments to fit around vents, air ducting, and around or over wheel wells of the vehicle. The height of the frame can be adjusted between about 66" to about 105".

Additional adjusting can occur by stacking multiple fitted inserts on the outer frame legs and support legs to lower a mounting height of the stretcher holders when the frame is at a maximum height. For the outer frame leg, the fitted inserts are installed by separating the leg and sliding the fitted insert onto the bottom portion of the outer frame leg to make adjustments to the mounting height of the stretcher holders; and then reassembling the outer frame leg. For the support legs, the fitted inserts are installed by removing stretcher holders from the support legs; sliding the fitted inserts onto the support leg; adjusting the mounting height of the stretcher holders; and remounting the stretcher holders on the support legs.

Adjusting of a frame length can include loosening bolts on the frame sleeve openings on sub-frames; using a stretcher for spacing, adjusting the distance between sub-frames by shifting sub-frames or sliding horizontal inter-frame connectors; and tightening all the nuts. Tightening of nuts can be with a ratchet or wrench, tighten all the nuts. A hacksaw from the installation tools can be used to shorten the length of horizontal inter-frame connector. A plastic end cap can be placed on the female end of the horizontal inter-frame connector.

Adjusting frame width can include ensuring that the angled header bar is secured to the outer frame leg; loosening and spreading apart the header bar assembly until the outer frame legs are at their furthest point; for wider spreads, unscrewing both angled header bars to adjust the header support bar; and using a wrench, tightening the angled header bars in place.

Adjustment parts can be installed as necessary to accommodate vehicle obstacles. For example installing a rubber wedge, on inclined floors (i.e., wheel well), can include placing one or more rubber wedges under the leg foot plates. Adhesive spray can be used on the rubber wedges to prevent slippage.

Safety devices can be installed throughout the conversion kit installation. Installation of safety devices can include inserting a plastic end cap into the last female end of the horizontal inter-frame connector. This cap can be removed as required to insert additional horizontal inter-frame connectors. Installation of safety devices can also include covering all exposed bolt heads, bolt threads, and nuts with rubber bolt covers located in the box of accessories of the installation tools. The header bar cover can be cut to a desired length and used to wrap the angled header bars.

Inter-frame connector mounts can be used when the normal frame sleeve openings on the outer frame legs are obstructed and cannot be utilized. An example would be if a ceiling mounted air conditioning unit prevents the horizontal inter-frame connector frame sleeve on the outer frame leg from matching up. Installing the inter-frame connector mount can include separating the outer frame leg and removing stretcher holders from the outer frame leg; sliding the inter-frame connector mounts onto the outer frame leg; remounting the stretcher holders onto the outer frame leg; and reassembling the outer frame leg.

Figure 10B:
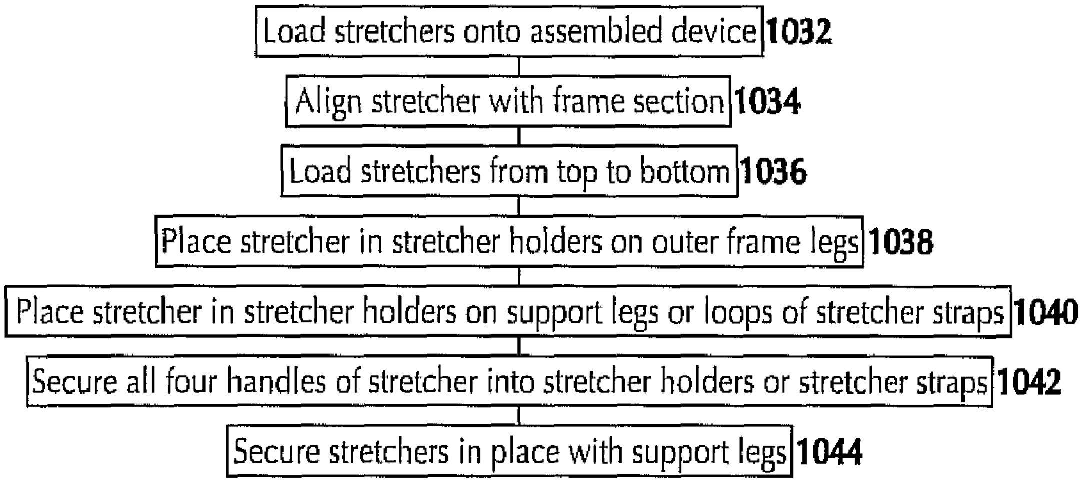

The assembled bus stretcher conversion kit can be utilized as described in FIG. 10B. Operation of the assembled bus stretcher conversion kit can include loading stretchers onto the assembled device at by carrying a patient on a stretcher into the bus at 1032; aligning the stretcher with its frame section at 1034; loading stretchers from top to bottom at 1036; placing the stretcher in the stretcher holders on the outer frame legs at 1038; placing the stretcher in stretcher holders on the support legs or in loops of stretcher straps at 1040; and securing all four handles of the stretcher into either stretcher holders or stretcher straps at 1042. Prior to transport, the loading can include securing the stretchers in place with support legs at 1044.

Figure 10C:
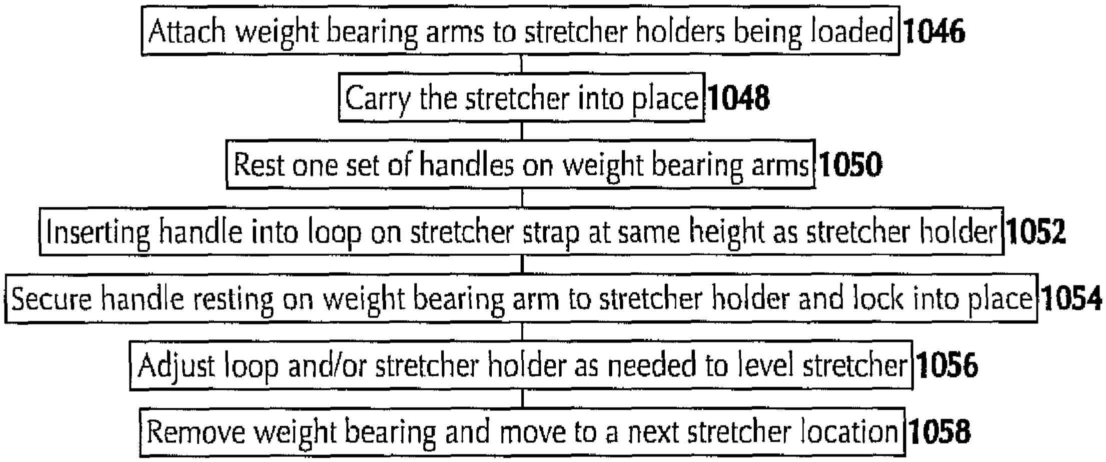

In addition, as depicted in FIG. 10C, weight bearing arms can assist with loading and unloading of stretchers, essentially by resting the stretcher handle on the arm while securing the other handle of the stretcher. The method can include attaching weight bearing arms to the stretcher holders that are being loaded at 1046; carrying the stretcher into place at 1048; resting one set of handles on the weight bearing arms at 1050; while holding the opposite stretcher handle, inserting the handle into the loop on the stretcher strap at the same height as the stretcher holder at 1052; securing the handle that was resting on the weight bearing arm to the stretcher holder and locking into place at 1054; adjusting the loop and/or stretcher holder as needed to make the stretcher level at 1056; and after the stretcher is loaded, removing the weight bearing arm by firmly pressing the release button on the weight bearing arm and moving it to a next stretcher location at 1058.

Disassembly of the assembled kit can include disassembling the kit in the reverse order it was installed, and storing the disassembled kit in a storage container.

While the invention has been illustrated with respect to one or more exemplary embodiments, alterations and/or modifications can be made to the illustrated examples without departing from the spirit and scope of the appended claims. In particular, although the method has been described by examples, the steps of the method may be performed in a different order than illustrated or simultaneously. In addition, while a particular feature of the invention may have been disclosed with respect to only one of several embodiments, such feature may be combined with one or more other features of the other embodiments as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." And as used herein, the term "one or more of" with respect to a listing of items such as, for example, "one or more of A and B," means A alone, B alone, or A and B.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Other embodiments of the invention will be apparent to those skilled in the art from consideration of the specification and practice of the invention disclosed herein. It is intended that the specification and examples be considered as exemplary only.

The invention claimed is:

1. A framework for supporting stretchers comprising:

a sub-frame comprising an adjustable length header bar assembly and adjustable height outer frame legs connected to opposing ends of the header bar assembly, the outer frame leg comprising an upper hollow L-shaped end and a base end, the hollow L-shaped end receiving a portion of the header bar assembly;

a frame sleeve non-movably fixed to the outer frame leg at a juncture or the L-shaped end, the frame sleeve configured to include dual sleeve openings;

a secondary stretcher support laterally interior of and parallel with each outer frame leg;

a stretcher holder connected to each of the outer frame leg and secondary stretcher support at corresponding selected heights; and interframe connectors transversely positioned between pairs of sub-frames and pairs of secondary stretcher supports;

wherein stretcher handles seat in the stretcher holder and the secondary stretcher support.

2. The framework of claim 1, further comprising at least one of a ceiling pressure mount removably connected to the header bar assembly and a wall pressure mount removably connected to an outer frame leg.

3. The framework of claim 1, wherein the sub-frame comprises a pair of angled header bars connected by a header support bar.

4. The framework of claim 3, wherein at least one angled header bar is adjustable relative to the header support bar.

5. The framework of claim 3, wherein the header support bar is fixed to one of the angled header bars, the remaining angled header bar longitudinally adjusted along a length of the header support bar.

6. The framework of claim 3, wherein each of the angled header bars are longitudinally adjustable along a length of the header support bar.

7. The framework of claim 1, wherein each header bar assembly further comprises a frame sleeve configured to receive the interframe connector therethrough.

8. The framework of claim 1, wherein the outer frame leg comprises a frame dual-sleeve configured to receive the interframe connector therethrough.

9. The framework of claim 1, wherein the secondary stretcher support is positioned to accommodate a stretcher between a pair of outer support legs and a pair of secondary stretcher supports.

10. The framework of claim 1, wherein the secondary stretcher support comprises a strap suspended from the header bar assembly, the strap comprising plural spaced stretcher handle support loops.

11. The framework of claim 10, wherein the handle support loops align with stretcher holders of the outer frame leg.

12. The framework of claim 10, wherein a pair of stretcher holders on a corresponding pair of outer frame legs align with handle support loops on a corresponding pair of suspended straps, the aligned stretcher holders and support loops configured to receive stretcher handles therein and support a stretcher in a substantially level position.

13. The framework of claim 1, wherein the secondary stretcher support comprises a support leg.

14. The framework of claim 13, wherein the support leg comprises a vertically adjustable leg and further comprising a stretcher holder connected to the support leg at selected heights.

15. The framework of claim 14, wherein a pair of stretcher holders on a corresponding pair of outer frame legs align with stretcher holders on a corresponding pair of support legs, the aligned stretcher holders on each of the outer frame legs and support legs configured to receive stretcher handles therein and support a stretcher in a substantially level position.

16. The framework of claim 1, wherein the secondary stretcher support comprises each of a suspended stretcher strap and a support leg, the secondary stretcher support positioned to accommodate a stretcher between a pair of outer support legs and a pair of secondary stretcher supports.

17. The framework of claim 1, wherein the interframe connector comprises longitudinally extensible components.

18. The framework of claim 1, wherein a pair of interframe connectors is connected to the frame sleeve of the outer support legs and a pair of interframe connectors is connected to the header bar assembly.

19. The framework of claim 1, configured to fit within dimensions of one of a mass transit vehicle, bus, crate, container, plane, train, ship, or room.

20. The framework of claim 1, wherein the framework is free-standing.

21. The framework of claim 1, wherein the framework is one of temporary and permanent.

22. A vehicle conversion kit comprising:

a customizable framework;

stretcher supports positioned on said framework;

tools for assembling the framework;

assembly instructions; and a crate for storing and transporting at least the framework, supports, tools, and assembly instructions.

23. The kit of claim 22, wherein the customizable framework is configured to fit within floor, ceiling and side walls of a mass transit vehicle, the framework configured to accommodate selectively removed vehicle seats.

24. The kit of claim 22, wherein the framework comprises a pair of longitudinally adjustable header bar assemblies, vertically adjustable support legs at outer ends of each header bar assembly, longitudinally extensible interframe connectors joining the pair of header bar assemblies, a pair of secondary stretcher supports positioned inward on each of the header bar assemblies to accommodate a stretcher between a pair of outer support legs and a pair of secondary stretcher supports, and means for stabilizing the framework against available external environs.

25. The kit of claim 24, the secondary stretcher support comprising a strap suspended from the header bar assembly, the strap comprising plural spaced stretcher handle support loops.

26. The kit of claim 25, wherein a pair of stretcher holders on a corresponding pair of outer frame legs align with handle support loops on a corresponding pair of suspended straps, the aligned stretcher holders and support loops configured to receive stretcher handles therein and support a stretcher in a substantially level position.

27. The kit of claim 22, the secondary stretcher support comprising a support leg.

28. The kit of claim 27, the support leg comprising a vertically adjustable leg and further comprising a stretcher holder connected to the support leg at selected heights.

29. The kit of claim 28, wherein a pair of stretcher holders on a corresponding pair of outer frame legs align with stretcher holders on a corresponding pair of support legs, the aligned stretcher holders on each of the outer frame legs and support legs configured to receive stretcher handles therein and support a stretcher in a substantially level position.

30. The kit of claim 24, wherein the secondary stretcher support comprises each of a suspended stretcher strap and a support leg, the secondary stretcher support positioned to accommodate a stretcher between a pair of outer support legs and a pair of secondary stretcher supports.

31. A method of assembling the conversion kit of claim 22 in a mass transit vehicle, the method comprising:

determining space required to assemble the conversion kit and a corresponding number of frames to be installed for that space;

selectively removing seats from the vehicle;

assembling a sub-frame;

selectively securing the sub-frame against vehicle ceiling and side walls;

connecting sub-frames with interframe connectors; and installing secondary stretcher supports coupled to the sub-frame and inset from outer ends thereof, the inset configured to accommodate a stretcher between outer ends of the sub-frame and the secondary stretcher supports.

32. The method of claim 31, further comprising installing safety components.

33. The method of claim 31, wherein assembling said sub-frame comprises assembling a header bar, connecting outer support legs to the header bar, and installing stretcher supports on the outer frame legs.

34. The method of claim 33, wherein assembling the header bar comprises connecting two angled header bars with a header support bar.

* * * * *